(12) United States Patent
Takezawa

(10) Patent No.: US 7,588,290 B2
(45) Date of Patent: Sep. 15, 2009

(54) VEHICLE-SEAT COVERING SYSTEM

(75) Inventor: Kiyoshi Takezawa, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/983,494

(22) Filed: Oct. 24, 2001

(65) Prior Publication Data
US 2002/0050734 A1   May 2, 2002

(30) Foreign Application Priority Data
Oct. 31, 2000   (JP) ............................. 2000-333744

(51) Int. Cl.
*A47C 31/00*   (2006.01)
*A47C 7/02*   (2006.01)
(52) U.S. Cl. ............. 297/218.2; 297/219.1; 297/452.58
(58) Field of Classification Search ............ 297/452.58, 297/452.6, 463.1, 463.2, 218.2, 228.11, 228.12, 297/219.1; 5/722, 723, 655
See application file for complete search history.

(56) References Cited

U.S. PATENT DOCUMENTS

| | | | | |
|---|---|---|---|---|
| 2,156,629 A | * | 5/1939 | Hutchinson | 297/452.25 |
| 4,317,591 A | * | 3/1982 | Ramsey | 297/452.6 |
| 4,772,070 A | * | 9/1988 | Leto et al. | 297/228.12 |
| 4,834,451 A | * | 5/1989 | Meunier et al. | 297/218.2 |
| 5,216,772 A | * | 6/1993 | Clute | 5/655 |
| 5,338,098 A | * | 8/1994 | Ohnishi | 297/452.6 |
| 5,641,024 A | * | 6/1997 | Lopez Alvarez | 169/52 |
| 5,641,204 A | * | 6/1997 | Lhuissier et al. | 297/452.48 |
| 6,003,939 A | * | 12/1999 | Nakai et al. | 297/216.13 |
| 6,079,779 A | * | 6/2000 | Tanaka et al. | 297/228.13 |
| 6,345,866 B1 | * | 2/2002 | Jackson et al. | 297/228.12 |

FOREIGN PATENT DOCUMENTS

| | | |
|---|---|---|
| DE | 19 09235 | 9/1970 |
| EP | 0359643 | 3/1990 |
| EP | 0433100 | 6/1991 |

\* cited by examiner

*Primary Examiner*—Sarah B McPartlin
(74) *Attorney, Agent, or Firm*—Lowe Hauptman Ham & Berner, LLP

(57) ABSTRACT

The invention provides a simple mechanism whereby the material of a seat-cover assembly of the side section of the front of a vehicle seat stretches so as to snugly fit the shape of the seat's seat-pad assembly, thereby covering the seat so that it has a good appearance. A material-puller is arranged, on the boundary of the side section of the seat and the central section of a seat-cover assembly that covers the seat, in such a way that (a) the material-puller's top-end side of an appropriate length is affixed to the boundary between the rear-bottom part of said central section and the rear-bottom part of the side section, (b) the material-puller's bottom end is affixed to the front of a piece of cloth at the back-face bottom end of the main-part seat-cover assembly in the last step of sewing the cover on the seat, and (c) the seat-cover assembly is attached to the seat by pulling the bottom end of the seat-cover assembly in the backside direction. The material-puller is composed of a material having less stretching capability than that of the seat-cover.

2 Claims, 6 Drawing Sheets

Fig.1 (a)
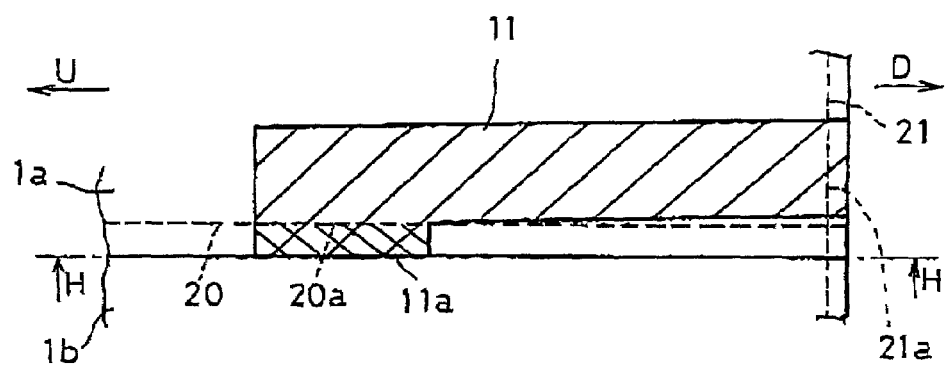
(b)
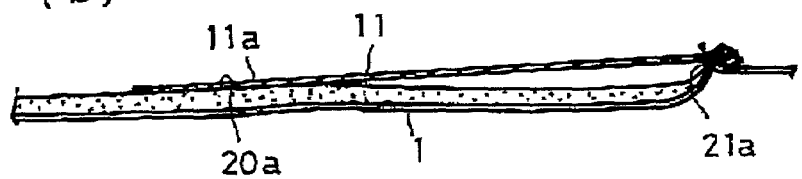
Fig.2
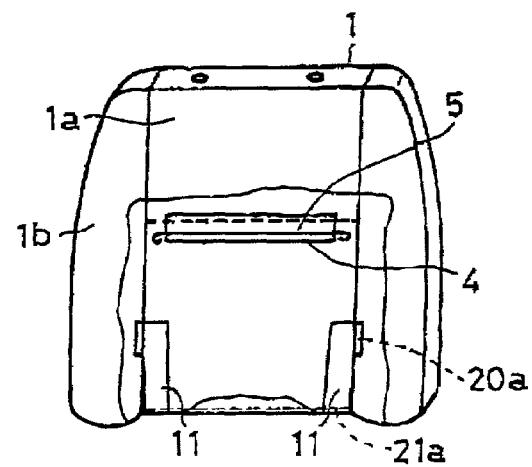

Fig.3
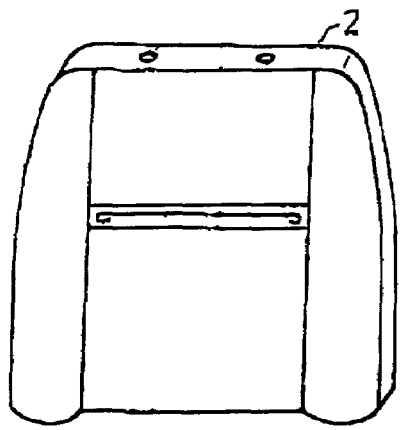
Fig.4
(a) 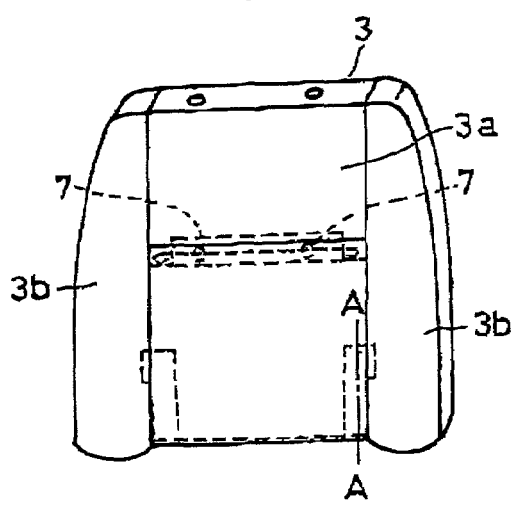
(b) 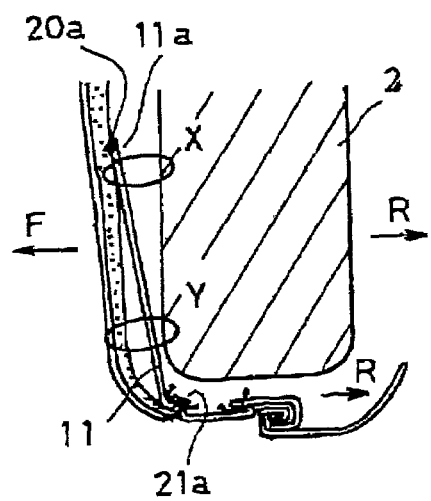

PRIOR ART

Fig.7 PRIOR ART (a)
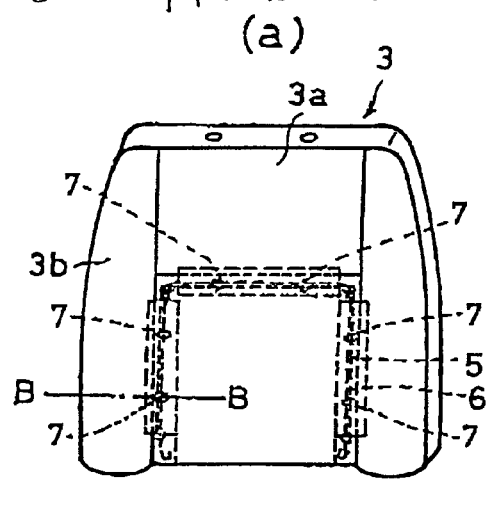
PRIOR ART (b)
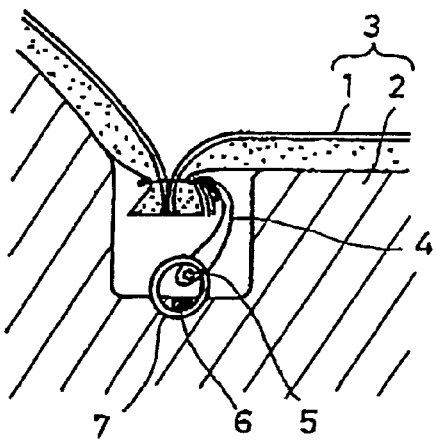
Fig.8 PRIOR ART (a)
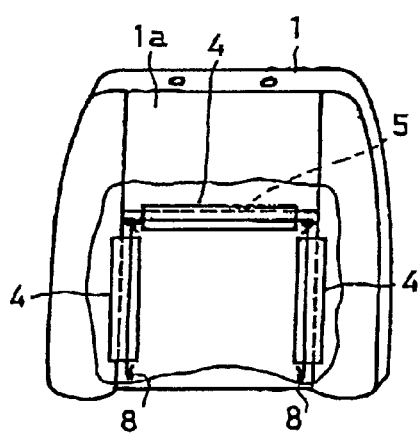
PRIOR ART (b)
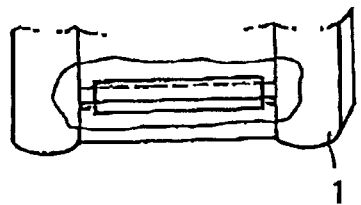

PRIOR ART

Fig.10 (a) PRIOR ART
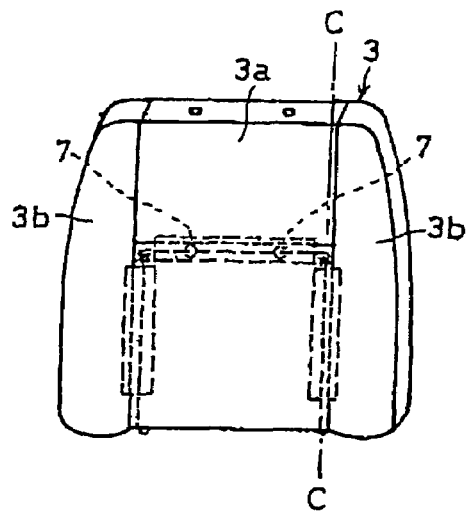
(b) PRIOR ART
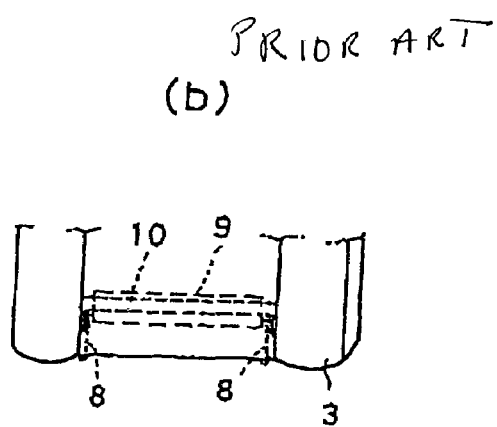
(c) PRIOR ART
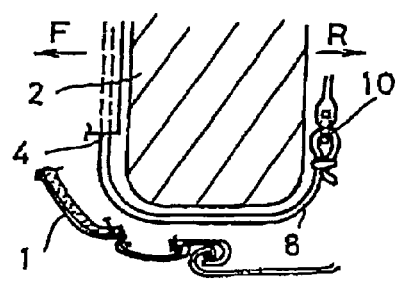
(d) PRIOR ART
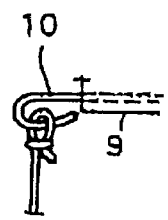

VEHICLE-SEAT COVERING SYSTEM

BACKGROUND OF THE INVENTION

1. Field of the Invention

This invention relates to a system for covering the seat of a motor vehicle.

2. Description of the Related Art

In a conventional method of installing a seat cover on the seat of a vehicle, a material-pulling wire, such as an end wire 5 as shown in FIG. 5 and FIG. 7 is mainly used, and a seat 3 is constituted in such a way that a seat-cover assembly unit 1 covers a seat-pad assembly 2.

As to a seat with a high round part as shown on the line B-B in FIG. 7, if the boundary 20 between a side section 1b and the central section 1a of the front side of a seat-cover assembly 1 is not affixed, the seat-cover assembly 1 at said boundary 20 (of a concave shape) will not snugly fit the seat-pad assembly 2, which results in the cover having a bad appearance. As a result, complicated processing operations as described below must be performed.

Similarly, as to a center section 3a and side sections 3b of a the front side of a seat 3, an end wire 5 that passes through the inside of a pulling-material bag 4 of the seat-cover assembly 1 and an insert wire 6 of the seat-pad assembly 2 are affixed with a C-ring 7 as shown in FIG. 7(b).

For side sections 3b of the front side of a seat 3, a fixing method using a pulling rubber as shown in FIG. 8-FIG. 10 also can be used instead of the above-mentioned method. However, the fixing method using a pulling rubber requires complicated processing operations similar to those using said material-pulling wire.

That is, as shown in FIG. 10(c) and FIG. 10(d), the top part of a pulling rubber 8 is hooked over the end wire 5 (see FIG. 5) of the seat-cover assembly 1 and the bottom part of the pulling rubber 8 is hooked over a rear wire 10 of the seat-cover assembly 1 (F is the front face and R is the rear face).

However, such prior art as that described above has the problem that the complicated processing operations mentioned above are required in order to prevent the seat-cover assembly at the boundary (of a concave shape), between the main part and the side section of the seat from fitting the seat-pad assembly too loosely.

SUMMARY OF THE INVENTION

For the purpose of solving the above-mentioned problem, the object of this invention is to provide (1) a system for installing the seat cover on the seat of a vehicle in such a way that the covered seat has a good appearance and (2) a simple mechanism whereby the seat-cover assembly of the side section of the front side of the seat snugly fits the shape of the seat-pad assembly.

For the purpose of solving the aforementioned problem, this invention is characterized such that a material-puller is arranged, along the boundary between the side section and the main central section of the seat-cover assembly that covers the seat, in such a way that (a) said material-puller's top-end side of an appropriate length is affixed to the boundary between the rear-bottom part of said main central section and the rear-bottom part of the side section, (b) said material-puller's bottom end is affixed to the front of a piece of cloth at the back-face bottom end of said central-front section of the seat-cover assembly in the last step of sewing the cover on the seat, and (c) said seat-cover assembly is attached to the seat by pulling the bottom end of said seat-cover assembly in the backside direction.

Said material-puller is characterized such that it is composed of a material having less stretching capability than that of said seat-cover.

BRIEF DESCRIPTION OF THE DRAWINGS

FIG. 1 shows a method of covering a vehicle seat using a material-puller in one embodiment of this invention; (a) is a partial plan view, and (b) is a sectional view along the line H-H.

FIG. 2 shows a view of the outside of a seat-cover assembly for a vehicle seat for vehicle using a material-puller in one embodiment of this invention.

FIG. 3 is a view of the outside of a seat-pad assembly for a vehicle seat using a material-puller in one embodiment of this invention.

FIG. 4(a) is a view of the outside of a vehicle seat using a material-puller in one embodiment of this invention, and FIG. 4(b) is a partial sectional view along the line A-A.

FIG. 7(a) is a view of the outside of a vehicle seat using a conventional material-pulling wire, and FIG. 7(b) is a partial sectional view along the line B-B.

FIG. 8(a) is a view of the outside of a seat-cover assembly of a vehicle seat using a conventional material-pulling rubber, and FIG. 8(b) is a partial rear-face view (the bottom part) of FIG. 8(a).

FIG. 10(a) is a view of the outside of a vehicle seat using a conventional material-pulling rubber; FIG. 10(b) is a partial rear-face view (the bottom part) of FIG. 10(a); FIG. 10(c) is a partial sectional view along the line C-C; and FIG. 10(d) is a partial appearance view seen from side R of FIG. 10(c).

DESCRIPTION OF THE PREFERRED EMBODIMENT

The present invention will now be described in detail with reference to the accompanying drawings.

Figure 5:
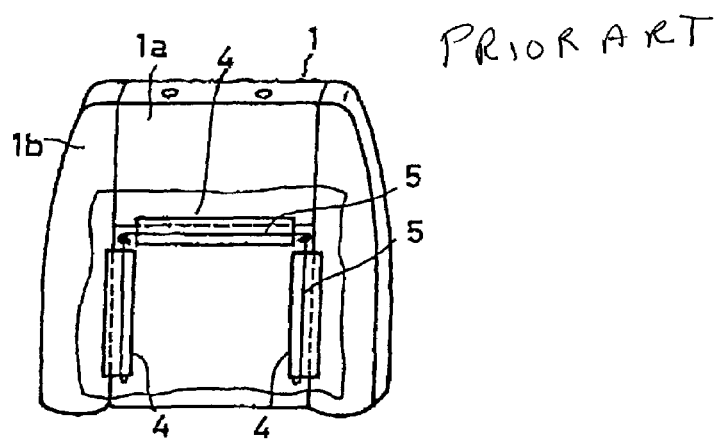
FIG. 5 is a view of the outside of a seat-cover assembly of a vehicle seat using a conventional material-pulling wire.
Figure 6:
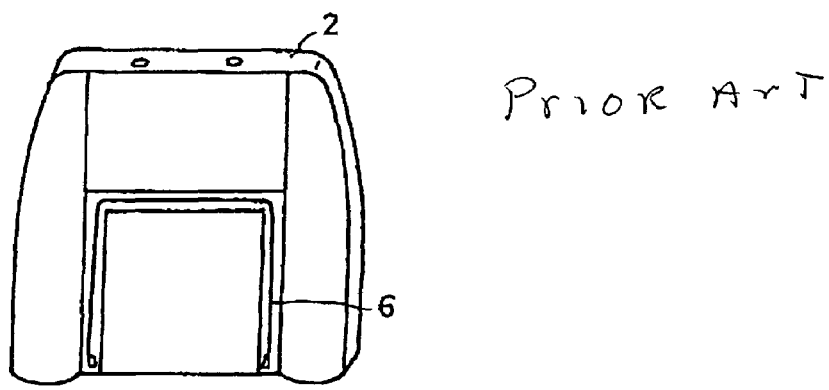
FIG. 6 is a view of the outside of a seat-pad assembly of a vehicle seat using a conventional material-pulling wire.
Figure 9:
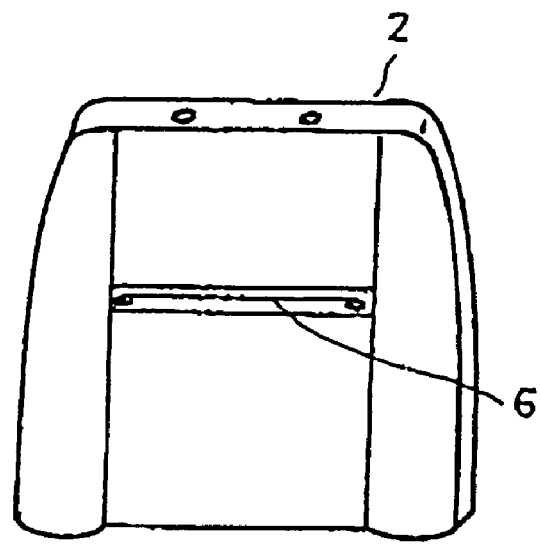
FIG. 9 is a view of the outside of a seat-pad assembly of a vehicle seat using a conventional material-pulling rubber.

FIG. 1-FIG. 4 show a vehicle seat 3 in one embodiment of this invention. Because the central section 1a of the front of the vehicle seat 3 is covered by use of a method that includes use of a material-puller similar to that of the prior art (see FIG. 5-FIG. 7), a detailed description of the central section 1a of the front of the vehicle seat 3 will be omitted.

The side section 1b (or 3b) of the front of a seat 3 will now be described in detail.

At the boundary 20 between the side section 1b and the central section 1a of the seat-cover assembly 1, when the central section 1a and the side section 1b (corner part) are sewn together, the top end of the material-puller 11 of an appropriate size is affixed to the boundary between the rear-bottom part of the central section and the rear-bottom part of the side section, and the bottom end of the material-puller 11 is affixed to the rear-bottom part of the central section 1a, as shown in FIG. 1 (U indicates up, and D indicates down) and FIG. 2.

The material-puller 11 is designed for pulling said side section 1b to the central section 1a.

A boundary fixing part 20a (of an appropriate length) of the material-puller 11 at a side-top end 11a is sewn and affixed to the boundary 20 at the rear-bottom part of said central section 1a together with the side section 1b, and also a bottom-end fixing part 21a of the material-puller 11 is sewn to the front of a piece of cloth 21 at the back-face bottom end of said central section 1a in the last step of sewing the cover on the seat.

At this time, said material-pullers 11 are sewn on said seat-cover assembly 1 in such a way that said material-pullers 11 have tension, and the front of a piece of cloth 21 at the bottom end of said seat-cover assembly 1 is pulled in the rear direction R as shown in FIG. 4(b).

It is preferable that said material-puller 11 be composed of a material such as cloth of less stretching capability than that of the seat-cover assembly 1. At the time of covering, the seat-cover assembly 1 is pulled downwards as described above. Since said material-puller 11 is shorter than said seat-cover assembly 1 as shown in FIG. 4(b) (F means a front face and R means a rear face), it snugly fits the seat-pad assembly 2 so as to remove clearances X and Y between the seat-cover assembly 1 and the seat-pad assembly 2, so as to prevent the seat-cover assembly 1 from fitting the seat-pad assembly 2 too loosely.

This invention, as described in detail above, has the following desirable effects that the prior art does not have:

(1) A material-puller (composed of a material such as cloth with less stretching capability than that of the seat-cover) is arranged in such a way that the material-puller's top-end side section of an appropriate length is affixed to the boundary between the back-face bottom part of the central section and the bottom part of the side section of the seat-cover, and that the material-puller's bottom end is affixed to the front of a piece of cloth at the back-face bottom end of the central section in the last step of sewing the cover on the eat. Then, because the bottom end of said seat-cover is pulled in the rear direction so that said seat-cover assembly is snugly attached to the seat pad, the seat-cover assembly does not fit the seat-pad assembly too loosely even in the case of a seat with an especially high round part, resulting in an improvement in the appearance of the seat cover.

(2) When the side section of the front of the seat is covered according to the system of this invention, the number of parts needed can be less than with the conventional method, so as to reduce costs and improve working efficiency. For example, if this invention's system is applied, two material-pulling rubbers, two pulling-material bags, one rear pulling-material bag (a rear pulling-material bag is represented by the number 9 in FIG. 10), and one rear wire can be omitted (although two material-pullers need to be added).

EXPLANATION OF NUMBERS IN THE DRAWINGS

1 Seat-cover assembly
1a Main part of seat-cover assembly
1b Side part of seat-cover assembly
2 Seat-pad assembly
3 Seat
3a Main part of seat
3b Side part of seat
4 Pulling-material bag
5 End wire
6 Insert wire
7 C-ring
8 Hoisting rubber
9 Rear pulling-material bag
10 Rear wire
11 Material-puller
11a Top end of material-puller
20 Boundary between side section and central section of front side of seat-cover assembly
20a Boundary fixing part
21 Front of piece of cloth
21a Bottom-end fixing part
D Down
F Front
R Rear
U Up
X, Y Clearances

What is claimed is:

1. A system for installing a seat cover on a vehicle's seat that has a central section and two side sections, wherein said system comprises:

a seat cover made from a stretchable material, and having a central section and two side sections, as well as boundaries between each of said side sections and said central section of said seat cover; and a material-puller made of a less stretchable material than the material of said seat cover, and having first and second respective strips extending in an upward and downward direction of the seat, wherein said first strip has a top-end side section extending in a lengthwise direction of said first strip, and said top-end side section of said first strip is sewn along one of said boundaries at a lower portion of an inside surface of one of said two side sections, so that a portion of the first strip, other than the top-end side section is not sewn to said seat cover, and that a surface of the first strip is opposed to a surface of said central section;

wherein said second strip has a top-end side section extending in a lengthwise direction of said second strip, and said top-end side section of said second strip is sewn along the other of said boundaries at a lower portion of an inside surface of the other of said two side sections, so that a portion of the second strip, other than the top-end side section is not sewn to said seat cover, and that a surface of the second strip is opposed to the surface of said central section;

wherein an upward-and-downward-direction length of the first strip or of the second strip is shorter than a length of a portion of the seat cover to which the first and second strips are opposed;

wherein respective bottom-ends of said first and second strips are affixed to a front of a piece of cloth at a back-face bottom end of said central section in a last step of sewing the seat cover, so that the first and second strips are in a state of tension at a time of this affixing, and wherein said seat cover can be installed on the seat of said vehicle seat so that the central section of said seat cover comes into close contact with the seat of said vehicle by placing said first and second strips in front of said seat of said vehicle seat and pulling a bottom end of said seat cover toward a rear of said seat of said vehicle, so as to make the seat cover conform to the shape of a front of the seat of said vehicle.

2. A system for installing a seat cover on the seat of a vehicle as described in claim 1, but wherein said material-puller has the shape of a belt.

* * * * *